United States Patent
Choi et al.

(10) Patent No.: US 10,972,018 B2
(45) Date of Patent: Apr. 6, 2021

(54) LOW FREQUENCY KINETIC ENERGY HARVESTER

(71) Applicants: Samsung Electronics Co., Ltd., Suwon-si (KR); THE PENN STATE RESEARCH FOUNDATION, University Park, PA (US)

(72) Inventors: Kyounghwan Choi, Suwon-si (KR); Qiming Zhang, State College, PA (US); Qing Wang, Collegeville, PA (US); Yong Zhang, State College, PA (US); Changkyu Jeong, State College, PA (US)

(73) Assignees: SAMSUNG ELECTRONICS CO., LTD., Gyeonggi-Do (KR); THE PENN STATE RESEARCH FOUNDATION, University Park, PA (US)

( * ) Notice: Subject to any disclaimer, the term of this patent is extended or adjusted under 35 U.S.C. 154(b) by 92 days.

(21) Appl. No.: 16/292,680

(22) Filed: Mar. 5, 2019

(65) Prior Publication Data

US 2020/0091839 A1    Mar. 19, 2020

(30) Foreign Application Priority Data

Sep. 14, 2018   (KR) .......................... 10-2018-0110459

(51) Int. Cl.
    *H02N 1/04*    (2006.01)
(52) U.S. Cl.
    CPC .................................... *H02N 1/04* (2013.01)
(58) Field of Classification Search
    CPC . H02N 1/00; H02N 1/04; H02N 11/00; H02N 11/002; H01M 10/00; H01M 10/04; H01M 10/041; H01M 10/0413; H01M 10/045; H01M 10/0459; H01M 10/05; H01M 10/052; H01M 10/0525; H01M 10/056; H01M 10/0565; H01M 10/0566; H01M 10/058; H01M 10/36; H01M 10/40;
    (Continued)

(56) References Cited

U.S. PATENT DOCUMENTS 7,824,806 B2   11/2010   Visco et al.
7,972,537 B2   7/2011    Meng et al.
(Continued)

FOREIGN PATENT DOCUMENTS

KR    101729149 B1      4/2017
KR    1020170072810 A   6/2017
KR    101810036 B1      12/2017

OTHER PUBLICATIONS

Alberto Giacomello et al., "Underwater energy harvesting from a heavy flag hosting ionic polymer metal composites," Journal of Applied Physics, Apr. 20, 2011, pp. 084903-1~084903-10, vol. 109.
(Continued)

*Primary Examiner* — Tran N Nguyen
(74) *Attorney, Agent, or Firm* — Cantor Colburn LLP

(57) ABSTRACT

A kinetic energy harvester includes a P-type hydrogel composite electrode; an N-type hydrogel composite electrode; a separator disposed between the P-type hydrogel composite electrode and the N-type hydrogel composite electrode; and a current collector between the P-type hydrogel composite electrode and the N-type composite electrode.

13 Claims, 7 Drawing Sheets

(58) Field of Classification Search
CPC .......... H01M 4/00; H01M 4/58; H01M 4/581;
H01M 4/582; H01M 4/5825; H01M 4/62;
H01M 4/622; H01M 6/00; H01M 6/10;
H01M 6/18; H01M 6/40; H01G 11/00;
H01G 11/48; H01G 11/28; H01G 11/42;
H01G 11/56
See application file for complete search history.

(56) References Cited

U.S. PATENT DOCUMENTS

| | | | |
|---|---|---|---|
| 9,013,092 B2 | 4/2015 | Mahapatra et al. | |
| 2006/0050189 A1* | 3/2006 | Ito | H02N 11/006 |
| | | | 349/33 |
| 2008/0220330 A1* | 9/2008 | Hosaka | H01M 10/0418 |
| | | | 429/209 |
| 2009/0303660 A1* | 12/2009 | Nair | H01G 11/36 |
| | | | 361/502 |
| 2010/0019209 A1 | 1/2010 | Meng et al. | |
| 2012/0043858 A1 | 2/2012 | Mahapatra et al. | |
| 2013/0292952 A1 | 11/2013 | Skotnicki et al. | |
| 2014/0292952 A1 | 10/2014 | Uchiyama | |
| 2017/0179853 A1 | 6/2017 | Choi et al. | |

OTHER PUBLICATIONS

Paul D. Mitcheson et al., "Energy Harvesting From Human and Machine Motion for Wireless Electronic Devices," Proceedings of the IEEE, Sep. 3, 2008, pp. 1457-1486, vol. 96, Issue No. 9.

\* cited by examiner

LOW FREQUENCY KINETIC ENERGY HARVESTER

CROSS-REFERENCE TO RELATED APPLICATION

This application claims priority to and the benefit of Korean Patent Application No. 10-2018-0110459, filed on Sep. 14, 2018, in the Korean Intellectual Property Office, and all the benefits accruing therefrom under 35 U.S.C. § 119, the content of which is incorporated herein in its entirety by reference.

BACKGROUND

1. Field

The present disclosure relates to an energy harvester, and more particularly, to an apparatus for harvesting energy (e.g., kinetic energy) of an object moving at a low frequency (hereinafter, a low frequency kinetic energy harvester).

2. Description of the Related Art

Along with an increase in the spread of portable electronic devices, an interest in capacity increase and lifespan extension of a battery or development of a power source that can replace the battery has also increased.

As one approach to this issue, research directed to harvesting energy from an environment of a device has been conducted.

Most current energy harvesting methods are based on piezoelectricity, electromagnetism, ions, and a variable capacitance.

There remains a need for an improved method for harvesting energy, and an energy harvester.

SUMMARY

Provided is a low frequency kinetic energy harvester capable of harvesting energy from the operation of an object moving at a low frequency.

Additional aspects will be set forth in part in the description which follows and, in part, will be apparent from the description, or may be learned by practice of the presented embodiments.

According to an aspect of an embodiment, a low frequency kinetic energy harvester includes: a P-type hydrogel composite electrode; an N-type hydrogel composite electrode; a separator disposed between the P-type hydrogel composite electrode and the N-type hydrogel composite electrode; and a current collector disposed adjacent to the P-type hydrogel composite electrode, the N-type composite electrode, or a combination thereof.

The P-type hydrogel composite electrode may include a polymer hydrogel layer including mobile cations and a first material which increases conductivity of the polymer hydrogel layer.

The N-type hydrogel composite electrode may include a polymer hydrogel layer including mobile anions and a second material which increases conductivity of the polymer hydrogel layer.

The polymer hydrogel layer including mobile cations may include Nafion, sulfonated poly(ether ether ketone) (SPEEK), sulfonated poly(arylene ether ketone ketone sulfone) (SPAEKKS), sulfonated poly(aryl ether ketone) (SPAEK), poly[bis(benzimidazobenzisoquinolinones)] (SPBIBI), poly(styrene sulfonic acid) (PSS), sodium 9,10-diphenylanthracene-2-sulfonate (DPAS$^-$Na$^+$), or a combination thereof.

The polymer hydrogel layer including mobile anions may include poly(diallyl dimethylammonium chloride) (PDAC), quaternary ammonium polysulphone (QAPS), tris(2,4,6-trimethoxyphenyl) polysulfone methylene quaternary phosphonium hydroxide (TPQPOH), quaternized PVA (QAPVA), quaternized poly(ether imide) (QPEI), [Ru(bpy)$_3$]$^{2+}$(PF$_6^-$)$_2$, or a combination thereof.

The polymer hydrogel layer including mobile cations, mobile anions, or a combination thereof, may include a hierarchical conductor network formed by the first material, the second material, or a combination thereof.

The first material, the second material, or a combination thereof, may include carbon.

The first material, the second material, or a combination thereof, may include carbon nanotube (CNT), silver nanowire (Ag NW), or a combination thereof.

A weight percentage (wt %) of each of the CNT and the Ag NW may be about 5 wt % to about 20 wt % based on a total weight of the first material, the second material, or a combination thereof.

A kinetic energy harvester stack including two or more kinetic energy harvesters units disposed adjacent to each other, wherein a kinetic energy harvester unit comprises a P-type hydrogel composite electrode; an N-type hydrogel composite electrode; and a separator disposed between the P-type hydrogel composite electrode and the N-type hydrogel composite electrode; and a current collector disposed adjacent to a top layer of the stack, a bottom layer of the stack, or a combination thereof.

The low frequency kinetic energy harvester stack may further include an ion barrier layer disposed between two or more of the energy harvesting units.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
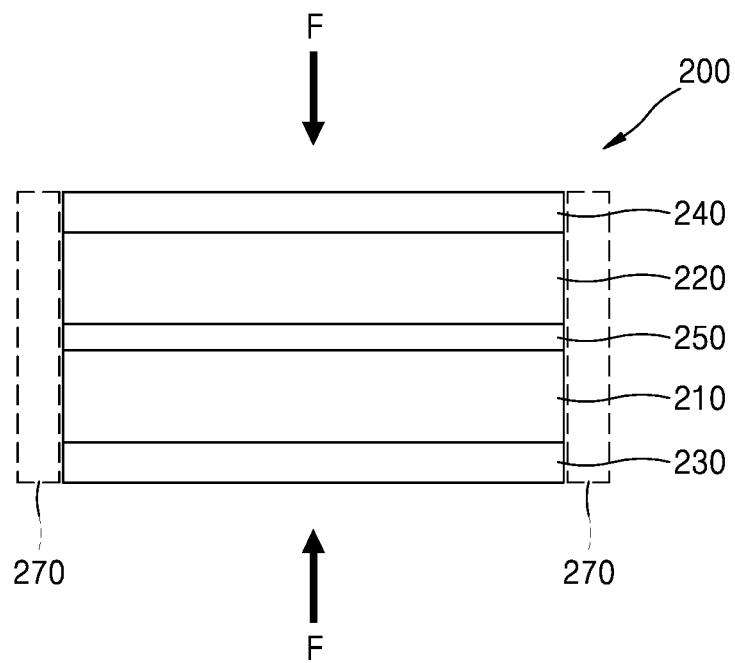
FIG. 1 is a cross-sectional view of an embodiment of a low frequency kinetic energy harvester.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

The terms used herein are merely used to describe particular embodiments, and are not intended to limit the present disclosure. An expression used in the singular encompasses the expression of the plural, unless it has a clearly different meaning in the context. Hereinafter, it is to be understood that the terms such as "including" or "having," etc., are intended to indicate the existence of features, numbers, operations, components, parts, elements, materials, or combinations thereof disclosed in the specification, and are not intended to preclude the possibility that one or more other features, numbers, operations, components, parts, elements, materials, or combinations thereof may exist or may be added. A forward slash, i.e., "/", as used herein, may be interpreted as either "and" or "or".

In the drawings, thicknesses of layers and regions may be enlarged or reduced for clarity. Throughout the specification, like reference numerals denote like elements. Throughout the specification, it will be understood that when one element such as layer, region, or plate, is referred to as being "on" another element, it may be directly on the other element, or intervening elements may also be present therebetween. It will be understood that, although the terms first, second, etc. may be used herein to describe various components, these components should not be limited by these terms. These terms are only used to distinguish one component from another.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Unless defined otherwise, all terms (including technical and scientific terms) in the specification may be defined as commonly understood by one having ordinary skilled in the art. The terms defined in a generally-used dictionary may not be interpreted ideally or exaggeratedly unless clearly defined. In addition, unless explicitly described to the contrary, the word "comprise" and variations such as "comprises" or "comprising," will be understood to imply the inclusion of stated elements but not the exclusion of any other elements.

Many mechanical or dynamic energy sources exist in an everyday life environment (e.g., movement of the human body, waves, wind, and the like). Various methods of harvesting energy from these energy sources have been attempted.

For example, research has been conducted on the use of, as an energy harvester, a triboelectric nanogenerator (TENG) in which triboelectric discharge and electrostatic induction are combined. An energy harvester using a nanogenerator has a relatively higher energy output than other harvesters with respect to an external mechanical energy input.

However, most energy harvesters, including the nanogenerator, are limited to operation when a frequency of external mechanical energy is high (e.g., a frequency higher than 100 Hz).

In an everyday life environment, there exist many elements (e.g., motion of a human being, waves, wind, and the like) which exhibit a mechanical motion with a low frequency (e.g., about 1 Hz) or operate or vibrate with a low frequency. However, current energy harvesters do not harvest energy effectively from the low energy sources.

An energy harvester using a hydrogel composite, as disclosed herein, solves this low frequency problem. The energy harvester disclosed herein harvests kinetic energy from an object moving or vibrating at a low frequency of less than or equal to 100 Hz, for example, about 10 Hz. When using this energy harvester, energy may be harvested from the motion of an object having a kinetic or vibration frequency in a low frequency region. When this energy harvester is combined with a device using a battery, for example, a portable electronic device or a wearable device, the energy harvester may be used as at least an auxiliary power source of the combined device.

Hereinafter, a low frequency kinetic energy harvester will be described in detail with reference to the accompanying drawings. In the description, the thicknesses of layers and regions shown in the drawings may be exaggerated for clarity of the specification.

FIG. 1 is a cross-sectional view of an embodiment of a low frequency kinetic energy harvester 200.

Referring to FIG. 1, the low frequency kinetic energy harvester 200 may include a first hydrogel composite electrode 210 (e.g., a p-type hydrogel composite electrode), a second hydrogel composite electrode 220 (e.g., an n-type hydrogel composite electrode), a first current collector 230, a second current collector 240, and a separator 250. The separator 250 may be disposed between the first and second hydrogel composite electrodes 210 and 220 to prevent any direct contact between the first and second hydrogel composite electrodes 210 and 220. The separator 250 may include a membrane capable of passing ions and small molecules therethrough. For example, the separator 250 may include glass microfiber, polypropylene, and polyethylene, taken alone or in combination. One of the first and second hydrogel composite electrodes 210 and 220 may be a p-type hydrogel composite electrode configured to provide mobile cations, and the other one may be an n-type hydrogel composite electrode configured to provide mobile anions. For convenience only, the first hydrogel composite electrode 210 is considered to be a p-type hydrogel composite electrode, and the second hydrogel composite electrode 220 is considered to be an n-type hydrogel composite electrode.

The first hydrogel composite electrode 210 configured to provide mobile cations may include a first polymer hydrogel layer including mobile cations and a first material which increases conductivity of the first polymer hydrogel layer.

The first polymer hydrogel layer may include, as an ion conductive polymer, Nafion, sulfonated poly(ether ether ketone) (SPEEK), sulfonated poly(arylene ether ketone ketone sulfone) (SPAEKKS), sulfonated poly(aryl ether ketone) (SPAEK), poly[bis(benzimidazobenzisoquinolinones)] (SPBIBI), poly(styrene sulfonic acid) (PSS), and sodium 9,10-diphenylanthracene-2-sulfonate (DPAS$^-$Na$^+$), taken alone or in combination. The first material may be a material which forms a hierarchical conductor network in the first polymer hydrogel layer. The first material may include carbon and may include, for example, carbon nanotube (CNT) and/or silver nanowire (Ag NW). In this case, a weight percentage (wt %) of each of the CNT and the Ag NW may be about 5 wt % to about 20 wt % based on a total weight of the first material.

The first hydrogel composite electrode 210 may be an elastic gel-type electrode. When the first hydrogel composite electrode 210 is an elastic gel-type electrode, the first hydrogel composite electrode 210 may be deformed in response to an external force.

The second hydrogel composite electrode 220 may be an electrode configured to provide mobile anions. The second hydrogel composite electrode 220 may include a second polymer hydrogel layer including mobile anions and a second material which increases conductivity of the second polymer hydrogel layer.

The second polymer hydrogel layer may include, as an ion conductive polymer, poly(diallyl dimethylammonium chloride) (PDAC), quaternary ammonium polysulphone (QAPS), tris(2,4,6-trimethoxyphenyl) polysulfone methylene quaternary phosphonium hydroxide (TPQPOH), quaternized PVA (QAPVA), quaternized poly(ether imide) (QPEI), [Ru(bpy)$_3$]$^{2+}$(PF$_{6-}$)$_2$, or a combination thereof.

The second material may be a material which forms a hierarchical conductor network in the second polymer hydrogel layer. The second material may include carbon and may include, for example, CNT and/or Ag NW. In this case, a weight percentage (wt %) of each of the CNT and the Ag NW may be about 5 wt % to about 20 wt % based on a total weight of the second material. The second hydrogel composite electrode 220 may be an elastic gel-type electrode. When the second hydrogel composite electrode 220 is an elastic gel-type electrode, the second hydrogel composite electrode 220 may be deformed in response to an external force.

The first and second current collectors 230 and 240 may be connected to the first and second hydrogel composite electrodes 210 and 220, respectively. For example, the first current collector 230 may be attached to a lower surface of the first hydrogel composite electrode 210, and the second current collector 240 may be attached to an upper surface of the second hydrogel composite electrode 220.

A current generated from the first hydrogel composite electrode 210 and a current generated from the second hydrogel composite electrode 220 may be transferred to an electronic device through the first current collector 230 and the second current collector 240, respectively. The first and second current collectors 230 and 240 may include a metal material, a conductive carbon material, or the like. The first and second current collectors 230 and 240 may be provided in the form of a metal foil or a metal mesh.

A metal plate (not shown) may be further connected to each of the first and second current collectors 230 and 240.

As shown using a dotted line, a member 270, e.g., a cylinder, encircling side surfaces of the first hydrogel composite electrode 210, the second hydrogel composite electrode 220, the separator 250, the first current collector 230, and the second current collector 240 may be further included. Accordingly, the low frequency kinetic energy harvester 200 may be mechanically supported.

When a force F for deforming the first and second hydrogel composite electrodes 210 and 220 is applied to the low frequency kinetic energy harvester 200 from the outside, the first and second hydrogel composite electrodes 210 and 220 may be expanded or contracted.

Figure 2:
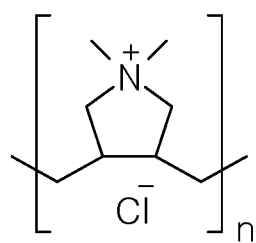
FIG. 2 illustrates a molecular structure of poly(diallyl dimethylammonium chloride) (PDAC) as an example of an ion conductive polymer included in a second polymer hydrogel of a second hydrogel composite electrode of the low frequency kinetic energy harvester shown in FIG. 1.

FIG. 2 illustrates a molecular structure of PDAC as an example of an ion conductor polymer included in the second polymer hydrogel layer of the second hydrogel composite electrode 220 of the low frequency kinetic energy harvester 200 of FIG. 1. The PDAC includes a polymer chain structure having positive charges, and a mobile chlorine anion (Cl$^-$).

Figure 3:
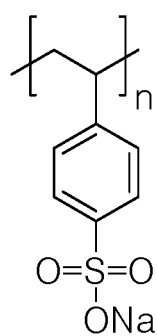
FIG. 3 illustrates a molecular structure of poly(styrene sulfonic acid) (PSS) as an example of an ion conductor polymer included in a first polymer hydrogel of a first hydrogel composite electrode of the low frequency kinetic energy harvester shown in FIG. 1.

FIG. 3 illustrates a molecular structure of PSS as an example of an ion conductor polymer included in the first polymer hydrogel layer of the first hydrogel composite electrode 210 of the low frequency kinetic energy harvester 200 of FIG. 1. The PSS includes a polymer chain structure having negative charges, and a mobile sodium cation (Na$^+$).

Structures and chemical compositions of the PDAC of FIG. 2 and the PSS of FIG. 3 are illustrated as one embodiment, and thus, the first and second polymer hydrogel layers are not limited to the examples of FIGS. 2 and 3.

The polymers, including the PDAC and the PSS, in the first and second polymer hydrogel layers are mixed with hydrogel. Herein, the hydrogel provides a moisture environment or a liquid environment such that mobile ions included in a polymer are movable. Each of the first and second polymer hydrogel layers may act as an ion conductor. The first and second polymer hydrogel layers may be mechanically flexible since the first and second polymer hydrogel layers are made of a polymer. However, in the alternative, the first and second polymer hydrogel layers may not be mechanically flexible.

Figure 4:
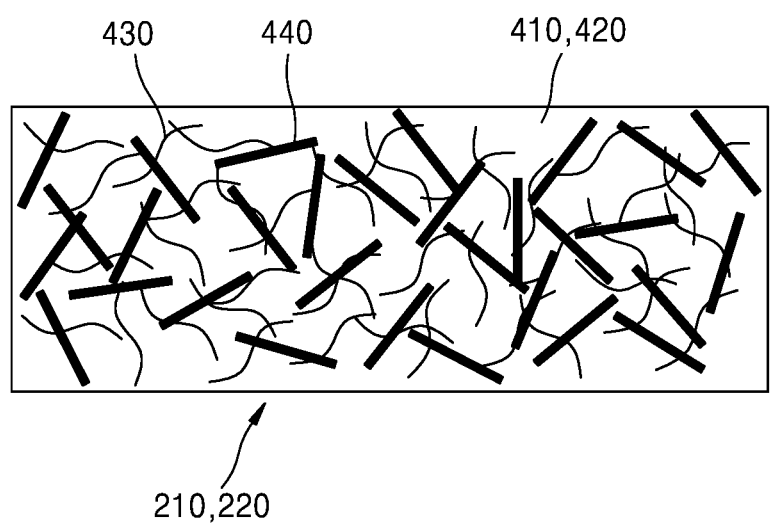
FIG. 4 is a cross-sectional view of an embodiment of a configuration of the first hydrogel composite electrode or the second hydrogel composite electrode of the low frequency kinetic energy harvester of FIG. 1.

FIG. 4 is a cross-sectional view of an embodiment of a configuration of the first hydrogel composite electrode 210 or the second hydrogel composite electrode 220 of the low frequency kinetic energy harvester 200 of FIG. 1.

Referring to FIG. 4, the first hydrogel composite electrode 210 may include a first polymer hydrogel layer 410, and materials 430 and 440 which form a hierarchical conductor network in the first polymer hydrogel layer 410. The materials 430 and 440 are examples of the first material described with reference to FIG. 1. The material 430 may be CNT, e.g., single-walled CNT, but is not limited thereto. The material 440 may be nanowire (NW). The second hydrogel composite electrode 220 may include a second polymer hydrogel layer 420, and the materials 430 and 440 which form a hierarchical conductor network in the second polymer hydrogel layer 420. The materials 430 and 440 are examples of the second material described with reference to FIG. 1. In this case, the material 430 may be CNT, and the material 440 may be NW. When the material 430 is CNT, the material 430 may be single-walled CNT but is not limited thereto. The material 440 may be replaced with another suitable material having similar characteristics to that of Ag NW.

As shown in FIG. 4, the materials 430 and 440 which form a hierarchical conductor network in the first and second polymer hydrogel layer 410 and 420 may be uniformly distributed throughout the first and second polymer hydrogel layer 410 and 420.

Although FIG. 4 shows that the two materials 430 and 440 which form a hierarchical conductor network are included in the first and second polymer hydrogel layer 410 and 420, only one of the two materials 430 and 440 may be included.

Figure 5A:
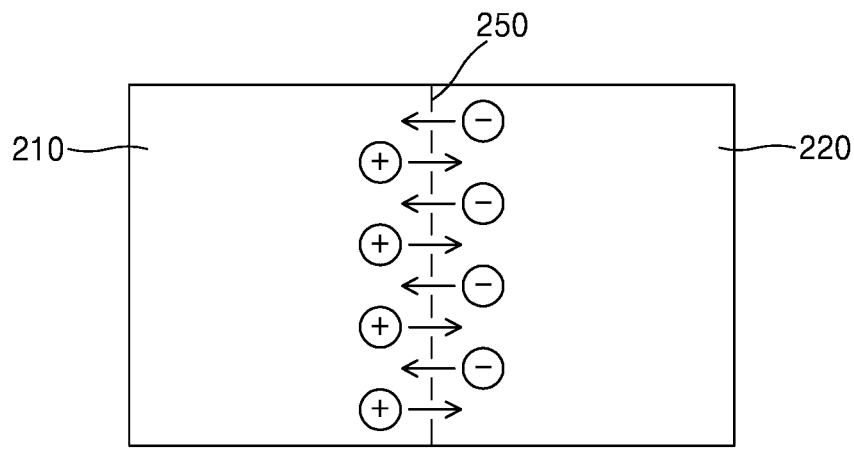
FIGS. 5A and 5B are cross-sectional views showing movement of ions and a process of forming a space charge region according to the movement of the ions when the first hydrogel composite electrode and the second hydrogel composite electrode are bonded to each other in the low frequency kinetic energy harvester of FIG. 1.
Figure 5B:
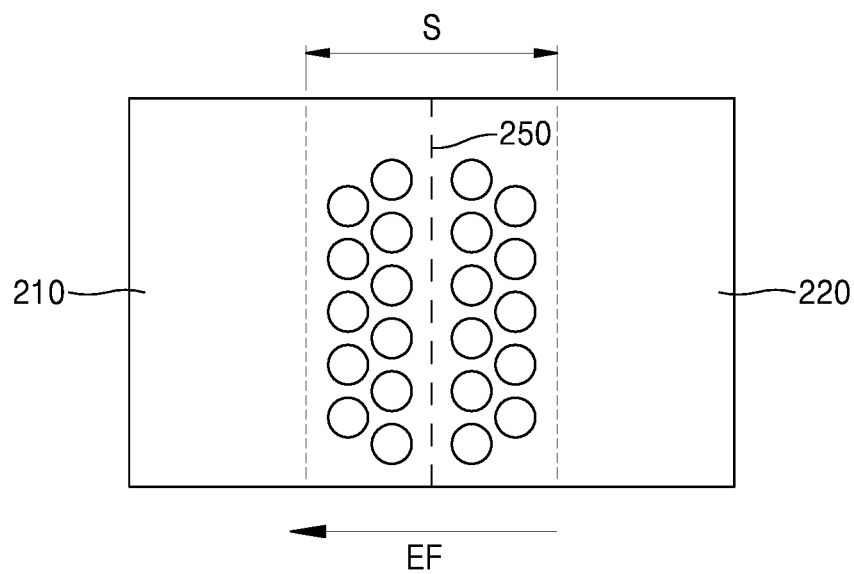

FIGS. 5A and 5B are cross-sectional views showing movement of ions and a process of forming a space charge region S according to the movement of the ions when the first hydrogel composite electrode 210 and the second hydrogel composite electrode 220 are bonded to each other in the low frequency kinetic energy harvester 200 of FIG. 1.

As shown in FIG. 5A, when the first hydrogel composite electrode 210 and the second hydrogel composite electrode 220 are bonded to each other, ions respectively included in the first and second hydrogel composite electrodes 210 and 220 are diffused to an opposite electrode due to an ion density difference. For example, the cations (+) (e.g., $Na^+$) in the first hydrogel composite electrode 210 may be diffused to the second hydrogel composite electrode 220, and anions (−) (e.g., $Cl^-$) in the second hydrogel composite electrode 220 may be diffused to the first hydrogel composite electrode 210. Accordingly, the anions (−) remain in the first hydrogel composite electrode 210, and the cations (+) remain in the second hydrogel composite electrode 220.

Thereafter, the anions (−) diffused to the first hydrogel composite electrode 210 may disappear by being re-bonded to cations in the first hydrogel composite electrode 210, and the cations (+) diffused to the second hydrogel composite electrode 220 may disappear by being re-bonded to anions in the second hydrogel composite electrode 220. As a result, as shown in FIG. 5B, the diffused and moved cations (+) and anions (−) disappear, and the space charge region S with no movable charge carriers is formed near a boundary surface. Only charged ions may remain in the space charge region S. Negative charged ions may remain at a side of the first hydrogel composite electrode 210 in the space charge region S, and positive charged ions may remain at a side of the second hydrogel composite electrode 220 in the space charge region S. As a result, a built-in potential is generated between the first and second hydrogel composite electrodes 210 and 220. An electric field (EF) may be generated in a direction from the second hydrogel composite electrode 220 to the first hydrogel composite electrode 210 by the built-in potential. The diffusion of cations (+) and anions (−) due to the ion density difference between the first and second hydrogel composite electrodes 210 and 220 may be suppressed by the EF. In addition, ions may also be moved by the EF. An ion movement direction by the EF is opposite to the diffusion direction due to the ion density difference between the first and second hydrogel composite electrodes 210 and 220. Accordingly, the diffusion due to the ion density difference between the first and second hydrogel composite electrodes 210 and 220 may be gradually reduced, and then an ion diffusion speed due to an ion density gradient between the first and second hydrogel composite electrodes 210 and 220 may be the same as an ion moving speed due to the built-in potential. As a result, movement of ions between the first and second hydrogel composite electrodes 210 and 220 may achieve a dynamic equilibrium state.

This state is similar to a dynamic equilibrium state between electrons and holes and also the behavior of a depletion region or a space charge region, which appear in a general silicon semiconductor p-n diode.

According to an embodiment, in the low frequency kinetic energy harvester 200, the mobile cations (e.g., $Na^+$) included in the first hydrogel composite electrode 210 may act as holes, and the mobile anions (e.g., $Cl^-$) included in the second hydrogel composite electrode 220 may act as electrons. Therefore, the first hydrogel composite electrode 210 may be referred to as a p-type hydrogel composite electrode, and the second hydrogel composite electrode 220 may referred to as an n-type hydrogel composite electrode.

The dynamic equilibrium state between the first and second hydrogel composite electrodes 210 and 220 may be broken due to various causes, for example, a deformation force applied from the outside to the low frequency kinetic energy harvester 200. A volume of the first and second hydrogel composite electrodes 210 and 220 may be changed due to the deformation force, and the changed volume may cause a change in the ion density difference between a width of the space charge region S in the first and second hydrogel composite electrodes 210 and 220, thereby causing a change in the built-in potential. After this change occurs, the first and second hydrogel composite electrodes 210 and 220 achieve a new dynamic equilibrium state, and in a process of achieving the new dynamic equilibrium state from the start of the change, a voltage and a current are generated.

For example, when external mechanical energy and/or stress is applied to the low frequency kinetic energy harvester 200, the dynamic equilibrium state between the first and second hydrogel composite electrodes 210 and 220 is broken. A volume of the first and second hydrogel composite electrodes 210 and 220 is changed by the external mechanical energy and/or stress. The changed volume causes a change in a density of each ion, a change in a diffusion speed, and a change in a width of a depletion region or the space charge region S. Accordingly, the built-in potential between the first and second hydrogel composite electrodes 210 and 220 is changed, and the change in the built-in potential causes a change in a voltage applied to an external circuit, and thus, a current may flow through the external circuit. When the external mechanical energy and/or stress disappears, a new dynamic equilibrium state is achieved, and in a process of achieving the new dynamic equilibrium state, a voltage and a current are generated in an opposite direction to a direction when the external mechanical energy and/or stress was applied. The external mechanical energy and/or stress may be applied to the low frequency kinetic energy harvester 200 at a low frequency, e.g., about 10 Hz or 10 Hz or less.

One of the deformation forces applied to the first and second hydrogel composite electrodes 210 and 220 may be generated by the general motion of a human being having an operation or vibrations of about 10 Hz or 10 Hz or less. Therefore, when the low frequency kinetic energy harvester 200 is used, kinetic energy from the general motion of a human being may be used as a power source or an auxiliary power source of an electronic device.

According to an embodiment, in the first and second hydrogel composite electrodes 210 and 220 of the low frequency kinetic energy harvester 200, ions in the entire volume of a composite may be moved, and an ionic moving speed may be slower than that of piezoelectricity or triboelectricity, and thus, a current may be obtained from mechanical energy of 10 Hz or less.

Figure 6A:
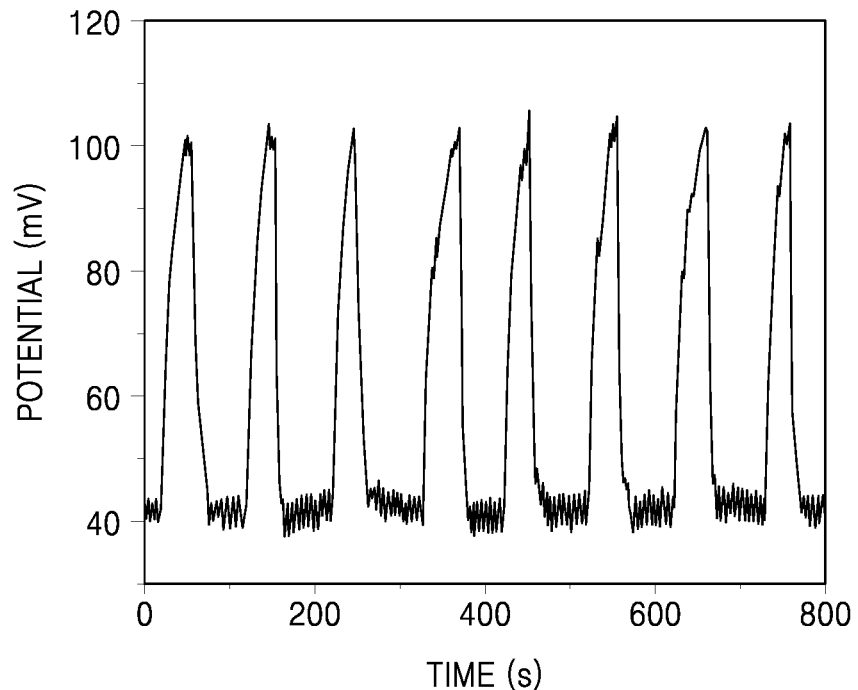
FIG. 6A is a graph of time (s) versus potential output (millivolts, mV) from an embodiment of the low frequency kinetic energy harvester.
Figure 6B:
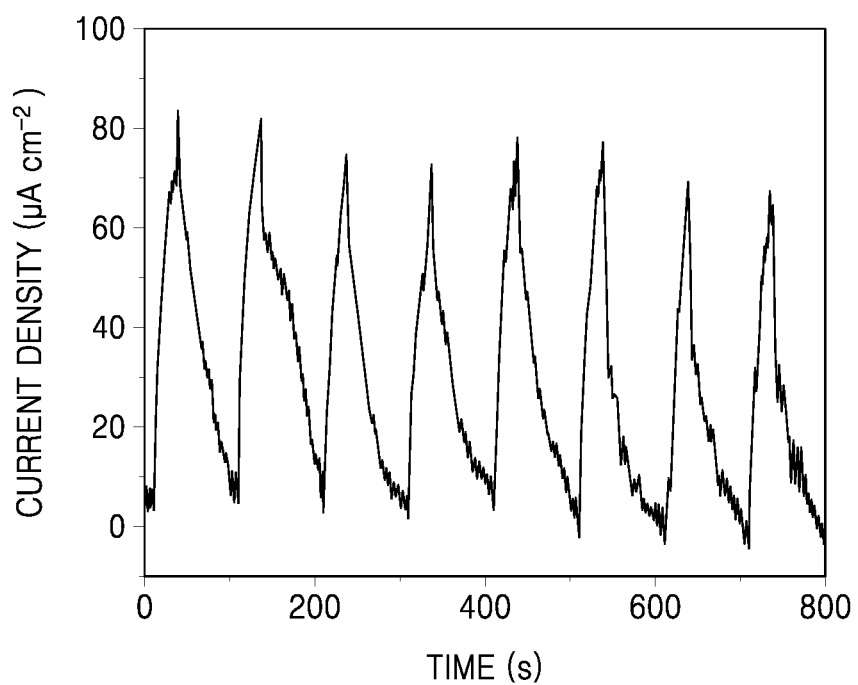
FIG. 6B is a graph of time (s) versus current density output (microamperes per square centimeter, $\mu A/cm^2$) from an embodiment of the low frequency kinetic energy harvester.

FIGS. 6A and 6B are graphs showing a potential (FIG. 6A) and a current density (FIG. 6B) output over time (s) from an embodiment of the low frequency kinetic energy harvester 200 when mechanical energy and/or stress is applied to the low frequency kinetic energy harvester 200 in a period of about 0.01 Hz.

A horizontal axis In FIGS. 6A and 6B indicates time (second, s), a vertical axis in FIG. 6A indicates potential (millivolts, mV), and a vertical axis in FIG. 6B indicates current density (microamperes per square centimeter, $\mu A/cm^2$).

Referring to FIGS. 6A and 6B, a very high voltage and current may be obtained even with respect to mechanical energy and/or stress of a very low frequency of 0.01 Hz.

Figure 7A:
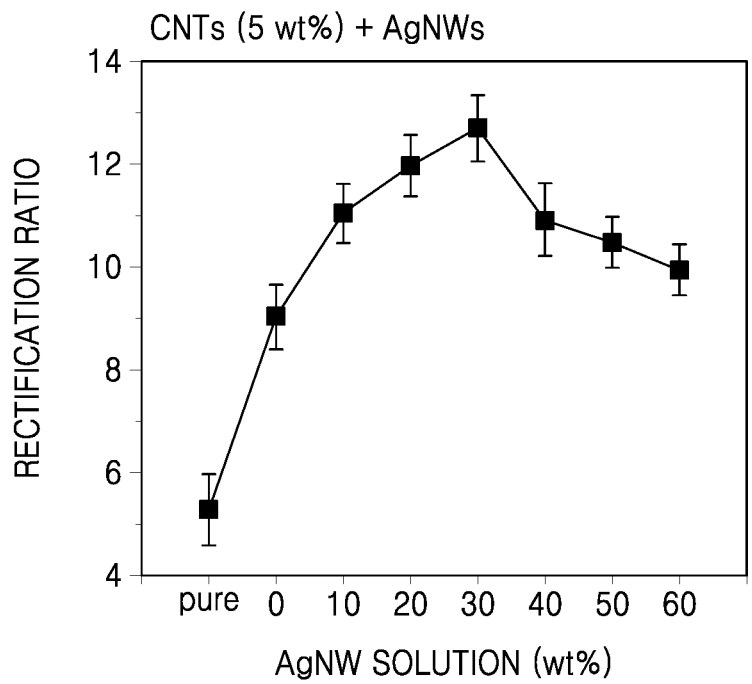
FIGS. 7A and 7B are graphs of rectification ratio versus content (weight percent, wt %) of an Ag NW solution forming a hierarchical network included in a hydrogel composite electrode, as experimental results for an embodiment of the low frequency kinetic energy harvester.
Figure 7B:
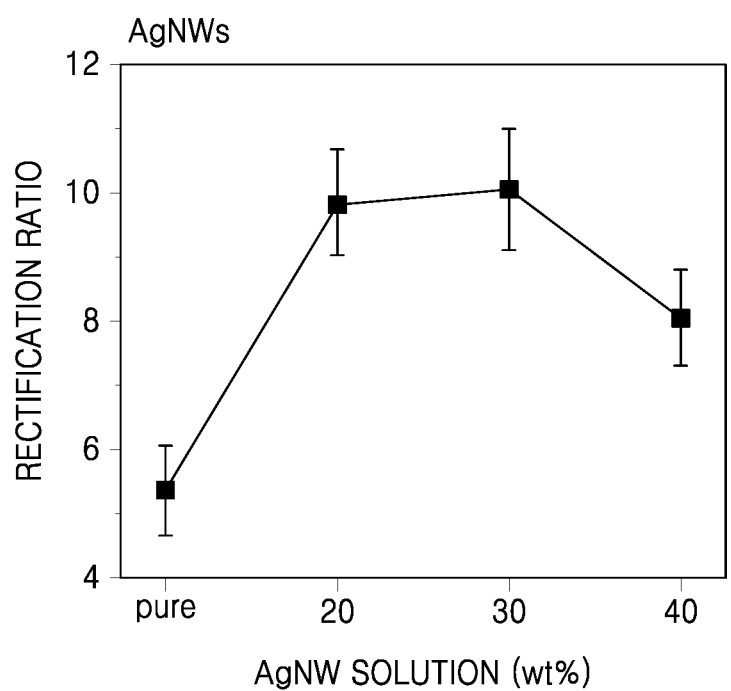

FIGS. 7A and 7B are graphs showing a rectification ratio and a content (wt %) of a carbon material forming a hierarchical network included in a hydrogel composite electrode, as experimental results for an embodiment of the low frequency kinetic energy harvester 200.

In FIGS. 7A and 7B, a horizontal axis indicates a weight percentage (wt %) of Ag NW in an aqueous solution (water), and a vertical axis indicates rectification ratio.

The results shown in FIG. 7A are obtained by measuring a rectification ratio according to a weight percentage (wt %) of Ag NW when the first and second hydrogel composite electrodes 210 and 220 of the low frequency kinetic energy harvester 200 include the Ag NW and 5 wt % of CNT as the material forming the hierarchical network.

The results of FIG. 7B are obtained by measuring a rectification ratio according to a weight percentage (wt %) of Ag NW when the first and second hydrogel composite electrodes 210 and 220 of the low frequency kinetic energy harvester 200 include only the Ag NW (i.e., no CNT) as the material forming the hierarchical network.

In the horizontal axis of FIGS. 7A and 7B, 'pure' indicates a case where the first and second hydrogel composite electrodes 210 and 220 include no carbon material forming the hierarchical network.

FIGS. 7A and 7B show that a rectification ratio of the low frequency kinetic energy harvester 200 when the first and second hydrogel composite electrodes 210 and 220 include CNT and/or Ag NW as the material forming the hierarchical network is greater than a rectification ratio of the low frequency kinetic energy harvester 200 when the material forming the hierarchical network in the first and second hydrogel composite electrodes 210 and 220 includes no carbon material.

In addition, FIGS. 7A and 7B show that a significant rectification ratio may be obtained when the first and second hydrogel composite electrodes 210 and 220 include CNT and/or Ag NW as the material forming the hierarchical network, but a greater rectification ratio may be obtained when the first and second hydrogel composite electrodes 210 and 220 include both CNT and Ag NW.

Figure 8:
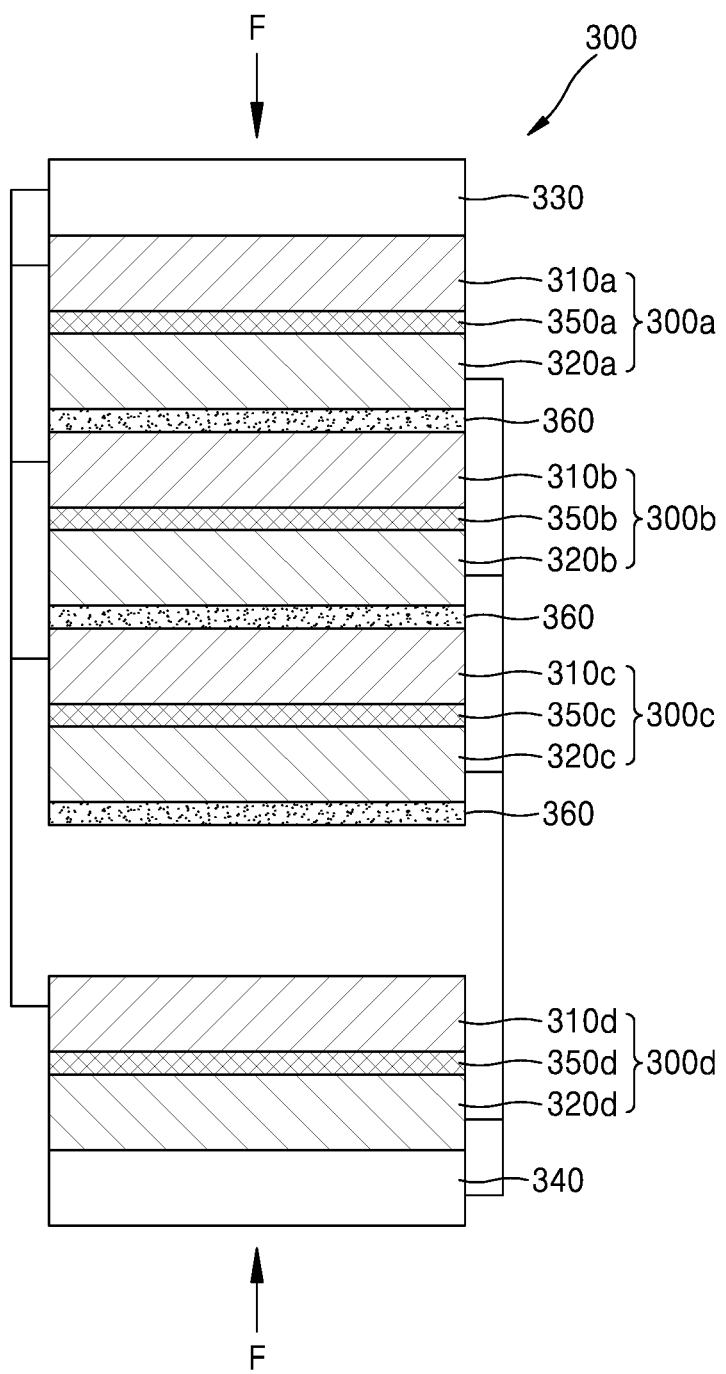
FIG. 8 is a cross-sectional view of an embodiment of a low frequency kinetic energy harvester.

FIG. 8 is a cross-sectional view of a low frequency kinetic energy harvester 300 according to another embodiment, as a case where a plurality of unit harvesters for harvesting low frequency kinetic energy are included.

Referring to FIG. 8, the low frequency kinetic energy harvester 300 may include a plurality of harvest units 300a, 300b, 300c, and 300d, a first current collector 330, and a second current collector 340. Each of the plurality of harvest units 300a, 300b, 300c, and 300d may be a unit for harvesting low frequency kinetic energy. The plurality of harvest units 300a, 300b, 300c, and 300d may be stacked in a direction parallel to a force F applied from the outside thereto. The plurality of harvest units 300a, 300b, 300c, and 300d include a first harvest unit 300a, a second harvest unit 300b, a third harvest unit 300c, and a fourth harvest unit 300d. The plurality of harvest units 300a, 300b, 300c, and 300d may include a plurality of first hydrogel composite electrodes 310a, 310b, 310c, and 310d, a plurality of second hydrogel composite electrodes 320a, 320b, 320c, and 320d, and a plurality of separators 350a, 350b, 350c, and 350d, respectively. The plurality of separators 350a, 350b, 350c, and 350d may be disposed between the plurality of first hydrogel composite electrodes 310a, 310b, 310c, and 310d and the plurality of second hydrogel composite electrodes 320a, 320b, 320c, and 320d, respectively.

Each of the plurality of first hydrogel composite electrodes 310a, 310b, 310c, and 310d may be the same as the first hydrogel composite electrode 210 of FIG. 1. Each of the plurality of second hydrogel composite electrodes 320a, 320b, 320c, and 320d may be the same as the second hydrogel composite electrode 220 of FIG. 1. An ion barrier layer 360 is placed between the plurality of harvest units 300a, 300b, 300c, and 300d. Movement of ions between the plurality of harvest units 300a, 300b, 300c, and 300d may be prevented by the ion barrier layer 360. The first current collector 330 may be connected to the plurality of first hydrogel composite electrodes 310a, 310b, 310c, and 310d, and the second current collector 340 may be connected to the plurality of second hydrogel composite electrodes 320a, 320b, 320c, and 320d. The first current collector 330 may be the same as the first current collector 230 of FIG. 1. The second current collector 340 may be the same as the second current collector 240 of FIG. 1. When the force F is applied from the outside to the low frequency kinetic energy harvester 300, the plurality of first hydrogel composite electrodes 310a, 310b, 310c, and 310d and the plurality of second hydrogel composite electrodes 320a, 320b, 320c, and 320d may be contracted.

When the ion barrier layer 360 has electrical conductivity, the plurality of harvest units 300a, 300b, 300c, and 300d may be electrically connected in series without electrically connecting the plurality of first hydrogel composite electrodes 310a, 310b, 310c, and 310d and the plurality of second hydrogel composite electrodes 320a, 320b, 320c, and 320d, respectively. Therefore, a current may be generated through the process described with reference to FIGS. 5A and 5B. The low frequency kinetic energy harvester 300 may generate a greater current by using the plurality of harvest units 300a, 300b, 300c, and 300d as compared to the use of a single energy harvest unit.

A low frequency kinetic energy harvester according to an embodiment disclosed above uses a method of inducing an external voltage and current by using an ion flow and an ion density difference between hydrogel ionic polymer composites instead of an energy harvest method using a piezoelectric material or a triboelectric phenomenon according to the related art. Particularly, ions in the entire volume of a hydrogel ionic polymer composite may be moved, and the movement of ions may be continuously performed for a long time, and thus, even when a deformation force having a motion or vibrations of a low frequency (e.g., 10 Hz or less)

is applied to a low frequency kinetic energy harvester, a greater current as compared to the related art is generated. In addition, since the illustrated low frequency kinetic energy harvester uses hydrogel, an energy harvester having high biocompatibility and being environmentally friendly may be easily implemented.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A kinetic energy harvester comprising:
   a p-type hydrogel composite electrode;
   an n-type hydrogel composite electrode;
   a separator disposed between the P-type hydrogel composite electrode and the N-type hydrogel composite electrode; and
   a current collector between the P-type hydrogel composite electrode and the N-type composite electrode,
   wherein each of the P-type hydrogel composite electrode and the N-type hydrogel composite electrode includes a hierarchical conductor network.

2. The kinetic energy harvester of claim 1, wherein the P-type hydrogel composite electrode comprises:
   a polymer hydrogel layer comprising mobile cations; and
   a first material which increases a conductivity of the polymer hydrogel layer, wherein the first material comprises carbon nanotube, silver nanowire, or a combination thereof.

3. The kinetic energy harvester of claim 1, wherein the N-type hydrogel composite electrode comprises:
   a polymer hydrogel layer comprising mobile anions; and
   a second material which increases a conductivity of the polymer hydrogel layer, wherein the second material comprises carbon nanotube, silver nanowire, or a combination thereof.

4. The kinetic energy harvester of claim 2, wherein the polymer hydrogel layer comprising mobile cations comprises Nafion, sulfonated poly(ether ether ketone), sulfonated poly(arylene ether ketone ketone sulfone), sulfonated poly(aryl ether ketone), poly[bis(benzimidazobenzisoquinolinones)], poly(styrene sulfonic acid), sodium 9,10-diphenylanthracene-2-sulfonate, or a combination thereof.

5. The kinetic energy harvester of claim 3, wherein the polymer hydrogel layer comprising mobile anions comprises poly(diallyl dimethylammonium chloride), quaternary ammonium polysulphone, tris(2,4,6-trimethoxyphenyl) polysulfone methylene quaternary phosphonium hydroxide, quaternized poly(vinyl alcohol), quaternized poly(ether imide), $[Ru(bpy)_3]^{2+}(PF_6^-)_2$, or a combination thereof.

6. The kinetic energy harvester of claim 2, wherein the hierarchical conductor network in the P-type hydrogel composite electrode is formed by the first material.

7. The kinetic energy harvester of claim 3, wherein the hierarchical conductor network in the N-type hydrogel composite electrode is formed by the second material.

8. The kinetic energy harvester of claim 2, wherein the first material comprises carbon.

9. The kinetic energy harvester of claim 3, wherein the second material comprises carbon.

10. The kinetic energy harvester of claim 2, wherein a content of each of the carbon nanotube and the silver nanowire is about 5 weight percent to about 20 weight percent, based on a total weight of the first material.

11. The kinetic energy harvester of claim 3, wherein a content of each of the carbon nanotube and the silver nanowire is about 5 weight percent to about 20 weight percent, based on a total weight of the second material.

12. A kinetic energy harvester stack, comprising:
    two or more kinetic energy harvester units disposed adjacent to each other, wherein each kinetic energy harvester unit comprises
    a p-type hydrogel composite electrode,
    an n-type hydrogel composite electrode, and
    a separator disposed between the p-type hydrogel composite electrode and the n-type hydrogel composite electrode; and
    a current collector disposed on a top layer of the stack, a bottom layer of the stack, or a combination thereof,
    wherein each of the p-type hydrogel composite electrode and the n-type hydrogel composite electrode includes a hierarchical conductor network.

13. The kinetic energy harvester stack of claim 12, further comprising an ion barrier layer disposed between the energy harvester units.

* * * * *